No. 896,979. PATENTED AUG. 25, 1908.
C. E. EVELETH.
FIELD REGULATION FOR MOTOR GENERATORS.
APPLICATION FILED MAR. 1, 1907.
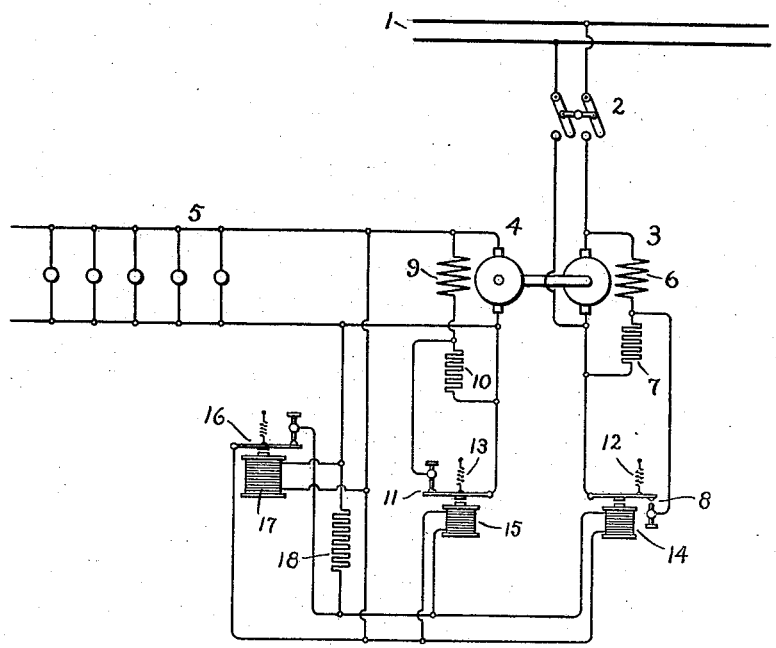
Witnesses
Irving E. Steen
J. Ellis Glen
Inventor:
Charles E. Eveleth.
by Albert G. Davis
Atty.

UNITED STATES PATENT OFFICE.

CHARLES E. EVELETH, OF SCHENECTADY, NEW YORK, ASSIGNOR TO GENERAL ELECTRIC COMPANY, A CORPORATION OF NEW YORK.

FIELD REGULATION FOR MOTOR-GENERATORS.

No. 896,979.      Specification of Letters Patent.      Patented Aug. 25, 1908.

Application filed March 1, 1907. Serial No. 359,956.

*To all whom it may concern:*

Be it known that I, CHARLES E. EVELETH, a citizen of the United States, residing at Schenectady, county of Schenectady, State of New York, have invented certain new and useful Improvements in Field Regulation for Motor-Generators, of which the following is a specification.

This invention relates to devices for maintaining constant potential on a motor-generator set where the line voltage is variable. Such conditions arise, for instance, where the motor-generator is used for supplying current to a lighting circuit, the motor being driven by current taken from a trolley circuit, on which the voltage often fluctuates through wide ranges. Any change in the power voltage, of course, varies the speed of the motor and thus varies the generator voltage.

My invention aims to regulate automatically not only the speed of the motor but the voltage of the generator, so that the combination of the two factors will result in keeping the latter voltage very steady irrespective of the fluctuations of the power voltage.

To this end, the invention consists in providing the field circuits of both the motor and the generator with regulators, preferably of the well-known Tirrill type shown for example in patent to Tirrill, No. 725,799, and connecting across the lighting mains an electromagnetic switch controlling the operating coils of the two regulators. One regulator, that in the motor circuit, is arranged to cut out resistance when the generator voltage rises and thus slow down the motor; while the regulator in the field circuit of the generator is arranged to cut in resistance at the same time, thus tending to reduce the voltage on the lighting circuit. Two separate regulators may be used; or, one regulator with two sets of contacts.

The accompanying drawing is a diagram of circuits illustrating my invention.

The mains 1 represent a power circuit on which the voltage is liable to fluctuate considerably; such as a trolley line. A suitable switch 2 enables these mains to be connected with the motor 3 of a motor-generator, whose generator end 4 is shown as supplying current to a lighting circuit 5. This is a common arrangement for lighting waiting rooms, sub-stations, and the like. In series with the field coil 6 of the motor is a resistance 7, around which is a shunt controlled by a switch 8. In like manner, the field coil 9 of the generator is in series with a resistance 10 around which is a shunt controlled by a switch 11. A spring 12 tends to keep the switch 8 open, while a spring 13 tends to keep the switch 11 closed. Connected with the movable lever of each switch is the armature of an electromagnet 14 15. When the electromagnet 14 is energized it closes the switch 8 and short-circuits the resistance 7. Similarly, when the magnet 15 is energized, it opens the switch 11 and cuts in the resistance 10. In order to operate both switches simultaneously, their coils are both connected across the lighting mains 5, and are adapted to be short-circuited by a switch 16 controlled by a coil 17 responsive to the line voltage. A resistance 18 cuts down the current flowing through the electromagnets 14 and 15 and the switch 16.

In practical operation, the switch 16 continually flutters by reason of the variations in voltage in the mains 5. The switches 8 and 10 are thereby kept in a state of constant agitation, so to speak, whereby the field currents of both the motor and the generator are kept constantly varying in order to compensate for the changes in the voltage of the power circuit. The result is that the voltage in the lighting circuit will be kept practically constant under variations in the power voltage amounting even to as much as a fluctuation from one half to full voltage in less than a second.

What I claim as new and desire to secure by Letters Patent of the United States, is:

1. The combination with a motor generator, of means responsive to the generator voltage for simultaneously varying the speed of the motor and the field strength of the generator.

2. The combination with a motor generator, of means responsive to the generator voltage for simultaneously and oppositely varying the speed of the motor and the field strength of the generator.

3. The combination with a motor generator, of means responsive to the generator voltage for simultaneously varying the field strength of both the motor and the generator.

4. The combination with a motor generator, of means responsive to the generator voltage for simultaneously and oppositely varying the field strengths of both the motor and the generator.

5. The combination with a motor-generator, of an electromagnetic switch controlling the field strength of the motor end, a second electromagnetic switch controlling the field strength of the generator end, and means for operating both switches simultaneously.

6. The combination with a motor-generator, of an electromagnetic switch controlling the field strength of the motor end, a second electromagnetic switch controlling the field strength of the generator end, and means for operating both switches simultaneously, said means being responsive to changes in the generator voltage.

7. The combination with a motor-generator, of regulators for the field strength of both ends thereof, and an electromagnetic device for simultaneously and oppositely actuating said regulators.

8. The combination with a motor-generator, of resistances in series with the field coils of each end thereof, a shunt around each resistance, and means controlled by the generator voltage for simultaneously opening one shunt and closing the other, and vice versa.

9. The combination with a motor-generator, of electric regulating devices for the fields of both ends thereof, said devices being connected across the mains taking current from the generator end, a normally open shunt around said devices, and a no-voltage switch for closing said shunt.

In witness whereof, I have hereunto set my hand this 23rd day of February, 1907.

CHARLES E. EVELETH.

Witnesses:
EDGAR D. DICKINSON,
WILLIAM R. CHAMBERS.